United States Patent
Gärtner et al.

[11] Patent Number: 5,669,365
[45] Date of Patent: Sep. 23, 1997

[54] INTERNAL COMBUSTION ENGINE WITH EXHAUST GAS RECIRCULATION

[75] Inventors: Uwe Gärtner, Weinstadt; Silvano Covini, Kernen, both of Germany

[73] Assignee: Mercedes-Benz AG, Stuttgart, Germany

[21] Appl. No.: 669,232

[22] Filed: Jun. 24, 1996

[30] Foreign Application Priority Data

Jul. 6, 1996 [DE] Germany ............. 195 24 603.9

[51] Int. Cl.$^6$ ............................................. F02M 25/07
[52] U.S. Cl. ........................................................ 123/570
[58] Field of Search ......................... 123/568, 569, 123/570; 60/278, 279, 311; 165/51, 95

[56] References Cited

U.S. PATENT DOCUMENTS

| | | | |
|---|---|---|---|
| 3,672,340 | 6/1972 | Bomba | 123/570 |
| 4,291,760 | 9/1981 | Argvle et al. | 123/570 |
| 4,345,572 | 8/1982 | Suzuki et al. | 123/570 |
| 4,593,748 | 6/1986 | Kramb | 165/51 |
| 4,756,285 | 7/1988 | Pischinger et al. | 123/274 |
| 4,864,821 | 9/1989 | Hoch | 60/274 |
| 4,960,167 | 10/1990 | Stenlund | 165/51 |
| 5,440,880 | 8/1995 | Ceynow et al. | 123/570 |
| 5,592,925 | 1/1997 | Machida et al. | 123/570 |

FOREIGN PATENT DOCUMENTS

| | | |
|---|---|---|
| 0 596 855 | 5/1994 | European Pat. Off. . |
| 35 06 217 | 8/1986 | Germany . |
| 40 07 516 | 9/1991 | Germany . |
| 94 21 145 | 4/1995 | Germany . |

*Primary Examiner*—Willis R. Wolfe
*Attorney, Agent, or Firm*—Klaus J. Bach

[57] ABSTRACT

In an internal combustion engine with exhaust gas recirculation wherein the engine has a charge air intake pipe for supplying combustion air to the engine, an exhaust pipe for discharging exhaust gas from the engine and an exhaust gas recirculation line extending between an exhaust gas recirculation valve arranged in the exhaust pipe and the charge air intake pipe for the controllable return of exhaust gas to the charge air intake pipe, a heat exchanger is disposed in the exhaust gas recirculation line and means are provided for supplying air under pressure to the heat exchanger for cleaning the heat exchanger.

6 Claims, 5 Drawing Sheets

INTERNAL COMBUSTION ENGINE WITH EXHAUST GAS RECIRCULATION

BACKGROUND OF THE INVENTION

The invention relates to an internal combustion engine with exhaust gas recirculation through a turbocharged air intake duct to which the exhaust recirculation gas is supplied by way of a recirculation line which includes a heat exchanger.

Internal combustion engines with exhaust gas recirculation via a recirculation line which includes a heat exchanger, that is an exhaust gas cooler, are known for example form DE 40 07 516 A1 and from DE 35 06 217 A1. By providing a heat exchanger in the exhaust gas recirculation line the efficiency of the internal combustion engine is improved. Also other advantages such as a reduction in NOx and particle emissions and in fuel consumption are obtained.

Problematic, however, are the particles in the exhaust gas of the internal combustion engine as they include aggressive substances and generally lead to a contamination of the heat exchanger which results in reduced heat exchanger efficiency. At this time, internal combustion engines of this type are still affected by this problem. No solution has been presented so far.

DE 94 21 145.0 U1 discloses a Diesel internal combustion engine with an exhaust system which includes a catalytic converter for the oxidation of hydrocarbons and an exhaust gas recirculation line for recycling exhaust gas to the air intake. The exhaust gas recirculation line includes a heat exchanger for cooling the exhaust gas which is arranged in the exhaust gas recirculation line upstream of the heat exchanger. In place of providing a catalytic converter, wall portions of the heat exchanger may be coated with catalytic material for the oxidation of the hydrocarbons.

It is the object of the present invention to provide an internal combustion engine with exhaust gas recirculation wherein particulate matter carried with the exhaust gas, especially chemically aggressive substances, do not detrimentally affect the heat exchanger arranged in the exhaust gas recirculation line.

SUMMARY OF THE INVENTION

In an internal combustion engine with exhaust gas recirculation wherein the engine has a charge air intake pipe for supplying combustion air to the engine, an exhaust pipe for discharging exhaust gas from the engine and an exhaust gas recirculation line extending between an exhaust gas recirculation valve arranged in the exhaust pipe and the charge air intake pipe for the controllable return of exhaust gas to the charge air intake pipe, a heat exchanger is disposed in the exhaust gas recirculation line and means are provided for supplying air under pressure to the heat exchanger for cleaning the heat exchanger.

Tests have indicated that cleaning the heat exchanger with the arrangement according to the invention wherein air under pressure is introduced into the heat exchanger against, or in, the flow direction of the exhaust gas prevents heavy soiling of the heat exchanger and, consequently, eliminates a loss in efficiency of the heat exchanger. Dependent on the degree of soiling, the exhaust gas flow and the pressurized air injection are so controlled that the heat exchanger is cleaned periodically or whenever a certain degree of soiling is present.

There are several possibilities for the injection of the pressurized air into the exhaust gas recirculation line.

For example, charge air could be used for this purpose. Also, if the vehicle is provided with a pressurized air system, compressed air from this system could be utilized for cleaning the heat exchanger.

The invention will be described in greater detail on the basis of the accompanying drawings.

DESCRIPTION OF THE PREFERRED EMBODIMENT

Figure 1:
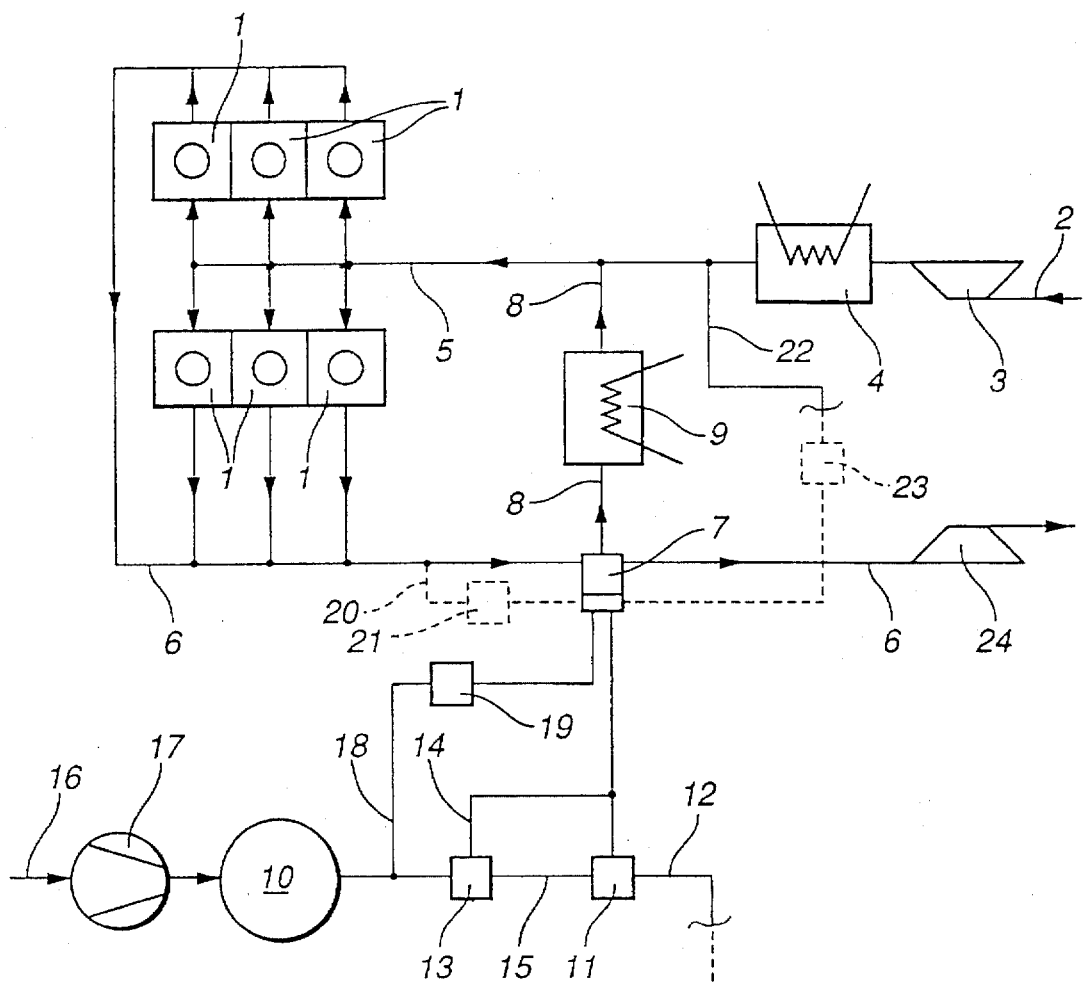
FIG. 1 is a schematic representation of the exhaust gas recirculation system for an internal combustion engine with cleaning of the heat exchanger by charge air.

Combustion air for an internal combustion engine, which is shown in FIG. 1 in principle to comprise six cylinders 1, is inducted by way of a suction pipe 2, is compressed in a charger 3 and, after passing through a cooler 4, is supplied to the cylinders 1 by way of an intake pipe 5. An exhaust pipe 6 which receives the exhaust gas from the cylinders 1 includes an exhaust gas recirculation valve 7. From the exhaust gas recirculation valve 7, the exhaust pipe 6 leads to an exhaust gas turbine 24 and is then discharged. However, an exhaust gas recirculation line 8 branches off the exhaust gas recirculation valve 7 and leads, via a heat exchanger 9, back to the intake pipe 5.

During normal exhaust gas recirculation operation by way of the exhaust gas recirculation line 8, the exhaust gas recirculation valve 7 is closed when the engine power output exceeds a predetermined value since, then, the charge air pressure in the intake pipe 5 exceeds the exhaust gas pressure in the exhaust pipe 6 and, consequently, no exhaust gas would flow through the exhaust gas recirculation line. On the contrary, in this case, compressed fresh air would by-pass the cylinders and flow directly to the exhaust pipe which, of course, is not desirable. This operational state is used, in a time-limited manner, for cleaning the heat exchanger 9. For this purpose, the exhaust gas recirculation system is altered by an electronic control system which is not shown in the drawings, in such a manner that, in suitable ranges of the engine characteristic performance graph, charge air from the intake pipe 5 is directed through the exhaust gas recirculation line 8 in opposition to the normal exhaust gas recirculation flow direction. It has been found that this counter-current flow removes deposits, aggressive substances and occasional condensate from the heat exchanger walls and carries them, via the correspondingly switched exhaust gas recirculation valve 7, to the exhaust pipe 6 from where they are discharged through the tail pipe.

A simple and inexpensive solution for recognizing the time when the heat exchanger needs to be cleaned is a pure time-dependent control whereby the cleaning takes place periodically dependent on the hours of engine operation.

More effective but also more complicated and more expensive is a constant surveillance of the gas flow through the heat exchanger by means of a flow measuring device by which however also the amount of the exhaust gas recirculated to the intake pipe could be controlled.

In another embodiment, a temperature sensor could be provided on the heat exchanger 9. The temperature sensor could be located at the exhaust gas entrance to the heat exchanger 9 and at the exhaust gas exit from the heat exchanger 9 and, additionally, at the entrance of the coolant to the heat exchanger 9. From the three temperatures which can be determined in this way, the heat exchange efficiency of the heat exchanger can be calculated. Ideal values can be recorded in an electronic control device in the form of a performance graph and the actual values can be constantly monitored. If the heat exchange rate changes, the cleaning procedure for the heat exchanger is initiated.

In still another embodiment, the pressure loss in the heat exchanger could be monitored. In this case, the gas pressure at the entrance to, and the exit of, the heat exchanger is to be measured. The duration of the cleaning may be controlled simply on the basis of time: After the predetermined cleaning period is over, the exhaust gas recirculation valve 7 is closed. If, during the cleaning procedure, the engine requires increased amounts of intake air as it may happen during strong acceleration periods, the exhaust gas recirculation valve 7 can be instantly closed whereby the heat exchanger cleaning procedure is interrupted and also the time count is stopped. This condition can be recognized by a control device. Afterwards, the cleaning procedure can be resumed taking into account the time interruptions.

The cleaning intervals can be predetermined and recorded in a control unit. If the intervals between the cleaning periods become smaller than a predetermined threshold value that is if there is some problem with the exhaust gas recirculation or cleaning system, the exhaust gas recirculation system is disabled by keeping the exhaust gas recirculation valve 7 closed. This condition may be indicated to the vehicle operator by a warning signal. While the exhaust gas recirculation system is disabled, engine operation is not detrimentally affected; there are only increased NOx emissions.

For this reason, it may be desirable during such periods to limit the engine power output by limiting the amount of fuel supplied to the engine in such a way that the maximum NOx emission obtained with the limited power output corresponds to the NOx emission during operation with operative exhaust gas recirculation system.

In the lower half of FIG. 1 and FIGS. 2 to 6, alternative arrangements for the generation of compressed air and the introduction thereof into the exhaust gas recirculation line 8 and also for the operation of the exhaust gas recirculation valve by compressed air are shown. In place of the charge air available from the intake pipe 5, in this case, compressed air from an on-board pressurized air system is utilized. Determination of the need for, and initiation of, the cleaning procedure for the heat exchanger 9 as well as the control and monitoring steps can be the same as described earlier.

A commercial vehicle which normally includes a pressurized air system, for example, can use compressed air for operating the exhaust gas recirculation valve 7. Otherwise, the engine vacuum system would be used for that purpose. However, if the pressurized air system is used, the pressure of the air taken from the pressurized air reservoir 10 of the constant-pressure on-board system must be modulated by way of a proportional position valve 11 in order to provide for different positions of the pneumatic exhaust gas recirculation valve 7. This procedure results in a loss of compressed air which is discharged by way of an outlet 12 of the electropneumatic pressure converter or proportional position valve 11. To minimize these losses, an additional switch over valve 13 may be provided in the air supply line 15 to the proportional position valve 11 which is utilized for the most common operating states, that is when the exhaust gas recirculation is fully opened or fully closed, such that selectively:

1. the maximum system pressure of the reservoir 10 is applied by way of a line 14 whereby the exhaust gas valve is fully opened and no leakage occurs,
2. the path via line 15 to the proportional valve 11 is opened whereby the air pressure is controlled such that the exhaust gas recirculation valve can be operated at various intermediate positions while, however, there is air leakage, or
3. both lines 14 and 15 are closed whereby the exhaust gas recirculation valve remains fully closed and no air leakage is present.

For the second case, means may be provided for returning the air discharged through line 12 either to the suction line 16 of an air compressor 17 for the reservoir 10 or to the suction pipe 2 of the charger 3.

Figure 2:
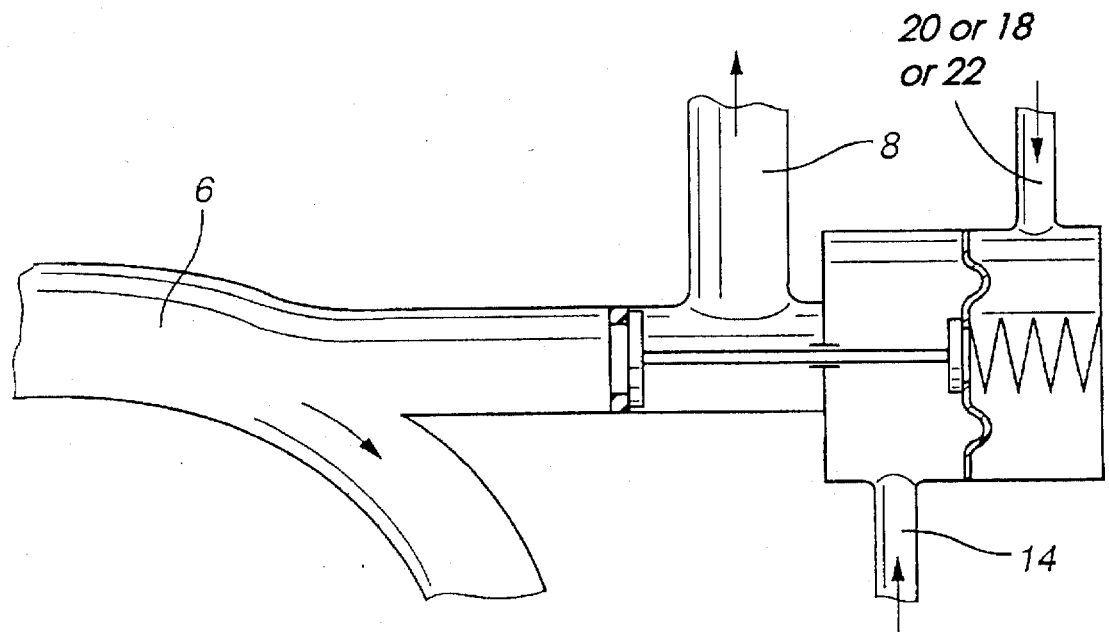
FIG. 2 shows an exhaust gas recirculation valve operable by pressurized air.

For application in commercial vehicles, it is further important to note that the high exhaust gas pressures developing in the exhaust pipe 6 during motor brake operation may open the exhaust gas recirculation valve 7 which should be closed during such operation. In that case, the motor braking capability is reduced. This undesirable condition could be eliminated by a suitable arrangement of the valve seat or by providing a recirculation valve 7 with high closing forces. However, if such solutions do not appear to be desirable because of design reasons, because of certain installation conditions or because of a deterioration of the valve dynamics or controllability, then it is proposed that, in order to avoid such a condition which may detrimentally affect the operational safety of a vehicle, during motor braking of a vehicle either the system pressure of the reservoir 10 is utilized to increase the closing force of the exhaust gas recirculation valve 7 by way of a line 18 with a shut-off valve 21 or to utilize the highly compressed exhaust gas in the exhaust pipe 6 by way of a line 20 with a shut-off valve 21. FIG. 2 shows a valve provided for this purpose. Through the lines 20 or 18, which are valve control lines, gas under pressure is supplied to the exhaust gas recirculation valve 7 in opposition to the gas pressure generated in the exhaust pipe 6. Other than during engine braking operation, pressure waves occurring occasionally in the exhaust pipe 6 may open the exhaust gas recirculation valve 7 in an undesirable manner.

In addition to the possibilities described above, for this case, the charge air may be utilized for increasing the closing force of the exhaust gas recirculation valve by way of a line 22 with a shut-off valve 23.

Figure 3:
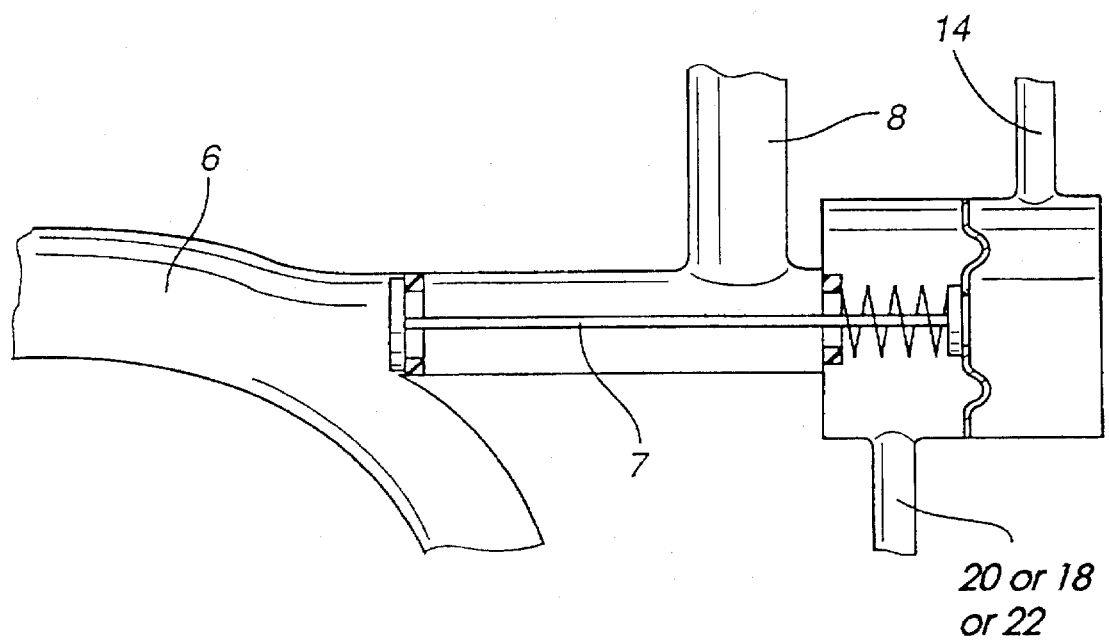
FIG. 3 shows another embodiment for an exhaust gas recirculation valve.

If the valve seat design of the exhaust gas recirculation valve 7 is as shown in FIG. 3, the exhaust gas recirculation valve 7 may be opened by the pressurized air in the intake pipe 5 rather than by the pressurized exhaust gas during operational periods wherein exhaust gas recirculation is not desired. For this reason, it is provided that, in that case, the procedure described in the previous paragraph is utilized, that is, that either the pressure of the charge air for the cylinders 1 is applied, by way of line 22 including shut-off valve 23, or the system pressure of the onboard pressurized air system is applied by way of line 18 including the shut-off valve 19, to the exhaust gas recirculation valve 7, in order to increase its closing force.

Figure 4:
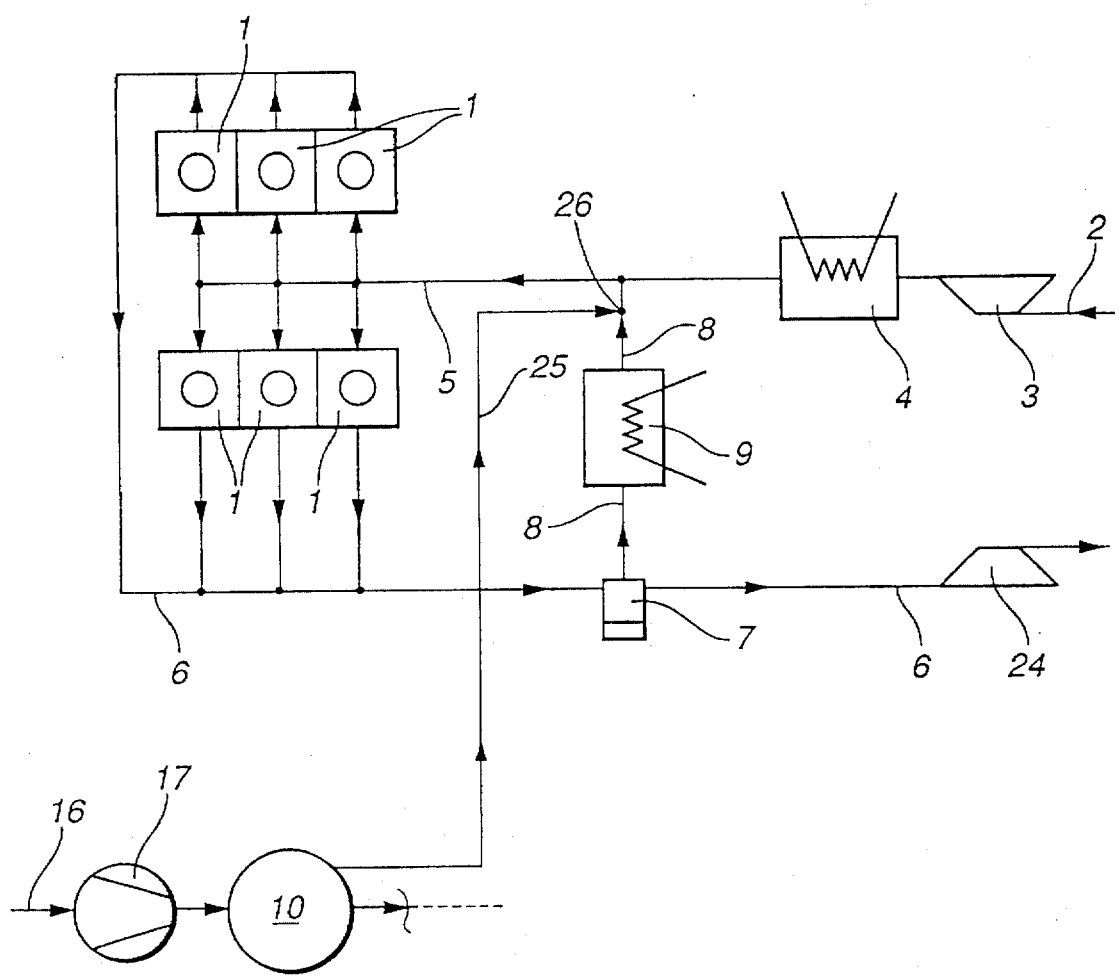
FIG. 4 shows a pressurized air line arrangement for cleaning the heat exchanger by pressurized air taken from an on-board pressurized air system.
Figure 5:
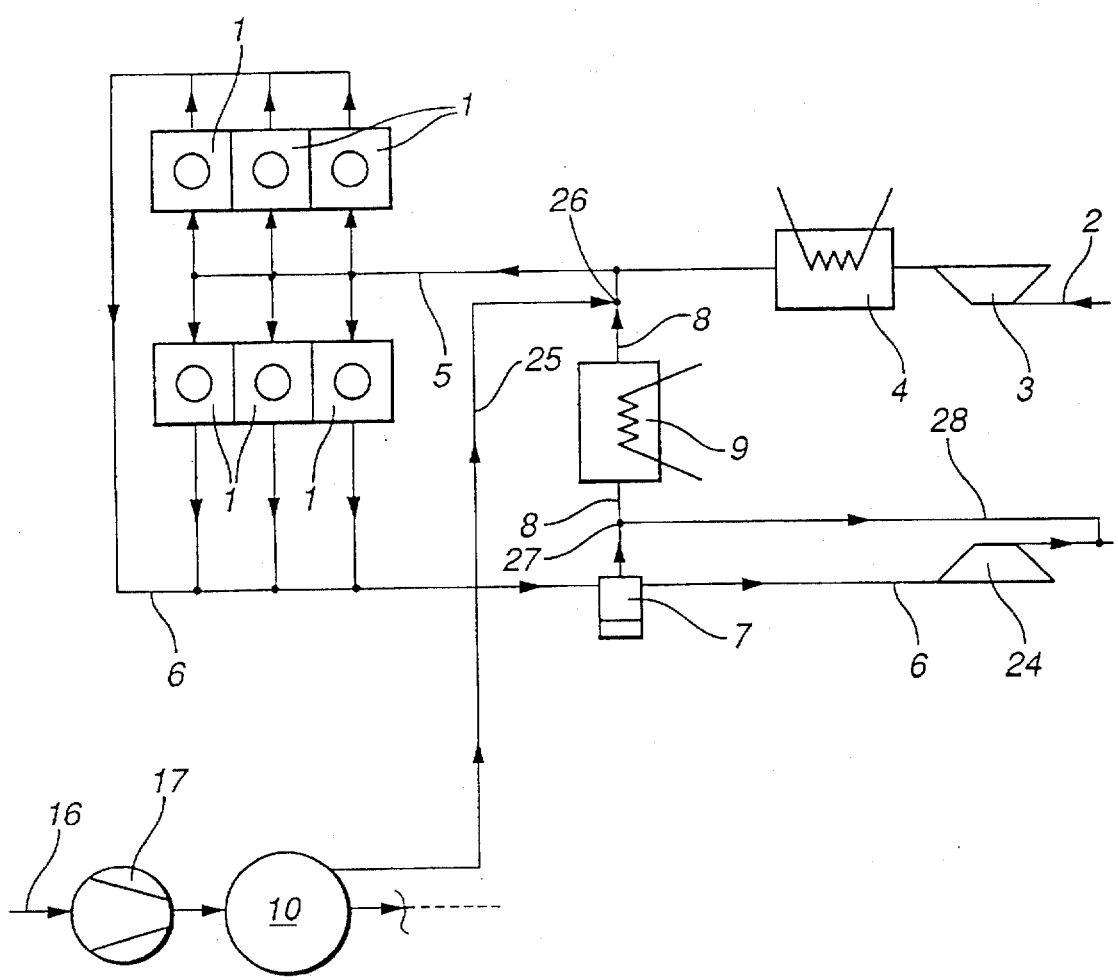
FIG. 5 shows a variation of the arrangement of FIG. 4.
Figure 6:
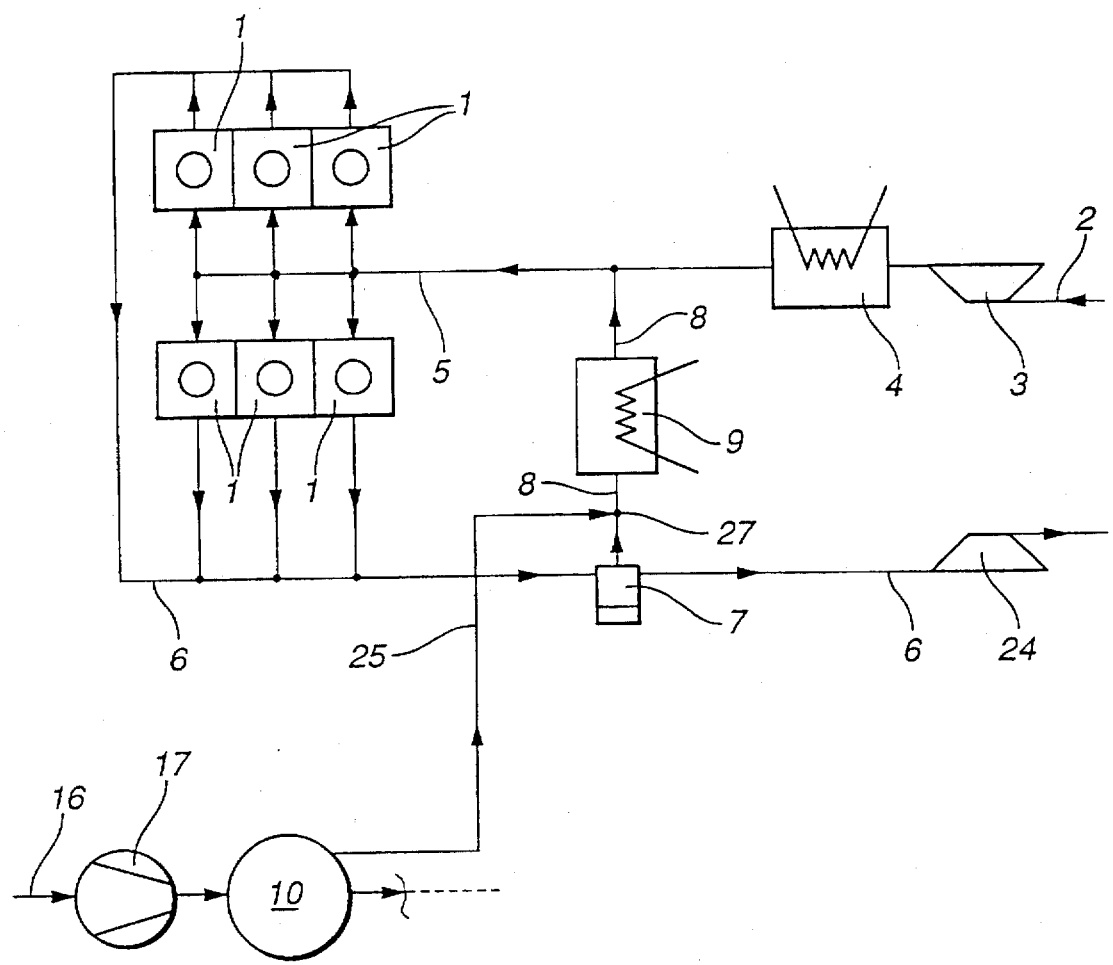
FIG. 6 shows a third embodiment for using pressurized air from the on-board system for cleaning the heat exchanger.

If pressurized air from the onboard compressed air system instead of charge air is utilized for cleaning the heat exchanger 9, there are various possibilities for arranging the pressurized air line 25 as shown in a simplified manner in FIGS. 4 to 6.

In the embodiment as shown in FIG. 4, a control device 26 which is disposed in the exhaust gas recirculation line 8 between the heat exchanger 9 and the intake pipe 5, closes the line to the intake pipe 5 whenever cleaning of the heat exchanger 9 is necessary and, at the same time, opens the pressurized air line 25. Then, the pressurized air from the reservoir 10 of the on-board compressed air system flows through the heat exchanger 9 and, via the exhaust gas recirculation line 8 and the correspondingly switched exhaust gas recirculation valve 7, to the exhaust pipe 6 and to the exhaust gas turbine 24.

If, after flowing through the heat exchanger, the pressurized air is not conducted into the exhaust pipe 6 and to the turbine 24, then the engine, particularly the air supply and the air change of the cylinders, remain essentially unaffected during the heat exchanger cleaning procedure.

With reference to FIG. 5, it is noted that, other than in the arrangement shown in FIG. 4, the exhaust gas recirculation valve may remain closed since the compressed gas is diverted from the exhaust gas recirculation line 8 by means of a control device 27 which is arranged between the heat exchanger 9 and the exhaust gas recirculation valve 7 and is conducted, via a bypass line 28, around the exhaust gas turbine 24.

FIG. 6 shows a third embodiment for handling the compressed air wherein, to initiate cleaning of the heat exchanger 9, the control device is opened and the exhaust gas recirculation valve 7 is closed. Compressed air from the reservoir 10 of the onboard pressurized air system then flows through the heat exchanger 9 and, on to the intake pipe 5 where it mixes with the fresh air of the intake pipe 5. The pressurized air flows, in this case, in the same direction through the heat exchanger as the recirculated exhaust gas, but the pressure of the air from the onboard pressurized air system is substantially greater so that a cleaning effect is still obtained.

This arrangement has the advantage that the deposits removed from the heat exchanger are returned to the engine and subjected to a combustion process so that a sudden high loading of the exhaust system is avoided.

What is claimed is:

1. An internal combustion engine, particularly for a motor vehicle, with exhaust gas recirculation, said engine having a charge air intake pipe for supplying combustion air to said engine, an exhaust pipe for discharging exhaust gases from said engine, an exhaust gas recirculation valve disposed in said exhaust pipe, an exhaust gas recirculation line extending between the exhaust gas recirculation valve of said exhaust pipe and said charge air intake pipe for returning exhaust gas from said exhaust pipe to said charge air intake pipe, a heat exchanger disposed in said exhaust gas recirculation line and a pressurized air supply arrangement for supplying air under pressure to said heat exchanger for cleaning said heat exchanger.

2. An internal combustion engine according to claim 1, wherein said pressurized air supply means is connected to said heat exchanger at the side thereof which is in communication with said charge air intake line for supplying said air under pressure against the flow direction of the exhaust gas recirculated through said heat exchanger.

3. An internal combustion engine according to claim 1, wherein said recirculation valve is controllable such that the fresh air under pressure is permitted to flow from said charge air intake pipe through said exhaust gas recirculation line to said exhaust pipe for cleaning said heat exchanger.

4. An internal combustion engine according to claim 1, wherein said motor vehicle includes an onboard compressed air system, said compressed air system being connected to said exhaust gas recirculation line for conducting air under pressure through said heat exchanger.

5. An internal combustion engine according to claim 4, wherein said exhaust gas recirculation valve is a pressurized air operated valve and a switch-over valve is provided for connection to said onboard compressed air system.

6. An internal combustion engine according to claim 4, wherein, for the introduction of pressurized air to said heat exchanger, said compressed air system is connected to said exhaust gas recirculation line between said recirculation valve and said heat exchanger.

* * * * *